United States Patent
Kimura

(10) Patent No.: US 7,949,155 B2
(45) Date of Patent: May 24, 2011

(54) IMAGE PROCESSING APPARATUS, IMAGE PROCESSING METHOD, AND STORAGE MEDIUM

(75) Inventor: Shunichi Kimura, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 799 days.

(21) Appl. No.: 11/223,008

(22) Filed: Sep. 12, 2005

(65) Prior Publication Data

US 2006/0204099 A1   Sep. 14, 2006

(30) Foreign Application Priority Data

Mar. 8, 2005   (JP) ................................. 2005-063996

(51) Int. Cl.
*G06K 9/22*   (2006.01)
(52) U.S. Cl. ........................................ 382/112; 382/177
(58) Field of Classification Search ................. 382/177, 382/112, 222, 228
See application file for complete search history.

(56) References Cited

U.S. PATENT DOCUMENTS

| 5,365,310 | A | * | 11/1994 | Jenkins et al. | 399/8 |
|---|---|---|---|---|---|
| 5,805,747 | A | * | 9/1998 | Bradford | 382/310 |
| 5,854,693 | A | * | 12/1998 | Yoshiura et al. | 358/468 |
| 6,236,756 | B1 | * | 5/2001 | Kimura et al. | 382/239 |
| 2002/0054693 | A1 | * | 5/2002 | Elmenhurst | 382/101 |
| 2003/0169925 | A1 | * | 9/2003 | Polonowski | 382/198 |
| 2004/0010758 | A1 | * | 1/2004 | Sarkar et al. | 715/531 |

FOREIGN PATENT DOCUMENTS

| JP | A 11-203411 | 7/1999 |
|---|---|---|
| JP | B2 3076692 | 6/2000 |
| JP | B2 3086520 | 7/2000 |
| JP | B2 3160898 | 2/2001 |
| JP | A 2002-77468 | 3/2002 |

* cited by examiner

*Primary Examiner* — Vikkram Bali
*Assistant Examiner* — Julian D Brooks
(74) *Attorney, Agent, or Firm* — Oliff & Berridge, PLC

(57) ABSTRACT

An image processing apparatus includes image memory that stores an image; character recognition rate acquisition unit that segments the image stored in the image memory into a plurality of partial images and acquiring a character recognition rate for each partial image; image quality assessment unit that calculates a parameter showing the image quality of the image based on the character recognition rates of the plural partial images acquired by the character recognition rate acquisition unit; and output unit that outputs assessment results obtained by the image quality assessment unit.

23 Claims, 5 Drawing Sheets

FIG. 9(A)
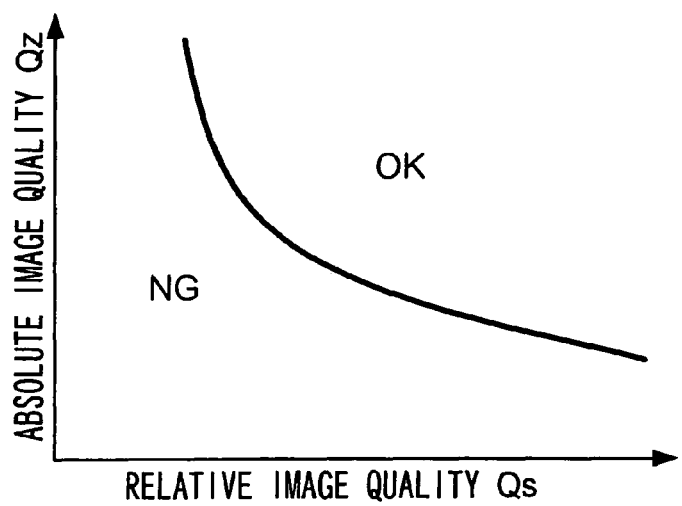
FIG. 9(B)
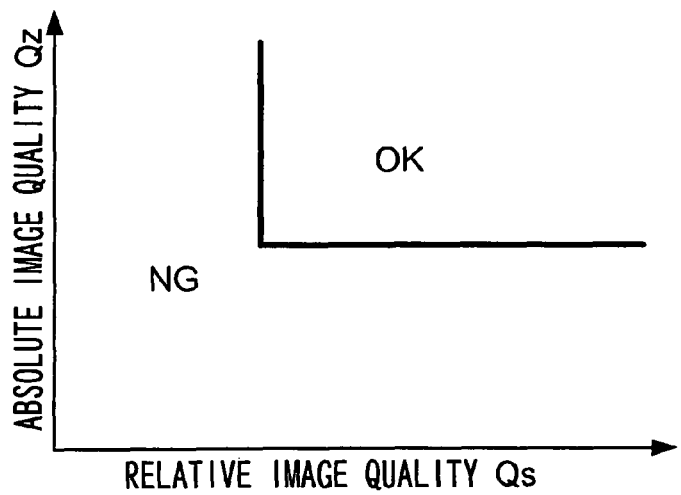
FIG. 10
PAGE 5 MAY CONTAIN SCANNING ERRORS.
SCANNED IMAGE QUALITY INDEX = 70
RESCAN?
[ YES ]   [ NO ]

IMAGE PROCESSING APPARATUS, IMAGE PROCESSING METHOD, AND STORAGE MEDIUM

BACKGROUND OF THE INVENTION

1. Field of the Invention

The present invention relates to a technology for assessing the image quality of scanned images.

2. Description of the Related Art

Paper documents (manuscripts) are read with a scanner (scanned in) in order to convert them to electronic form and use, or save, as scanned image data. Furthermore, after scanning in a document made up of characters and converting it to image data form, the image data is subjected to character recognition processing in order to obtain text data indicating character codes. Because text data is superior in terms of processing, re-writing, and searching, it is extremely useful when converting paper documents to electronic form. However, due to the fact that the scanning process involves paper, whenever the paper has physical defects, such as "folding" and "bending", and there occur the so-called "scanning errors", part of the information contained in the paper document is lost in the scanned image obtained by scanning the document. In such a case, the paper document has to be re-scanned, but the decision as to whether the re-scanning is necessary has to be made by the user by visually checking the scanned image data.

The present invention was made with account taken of the above-mentioned circumstances and provides an image processing technology, in which localized image quality deterioration due to folding and bending. of paper can be assessed based on character recognition results.

SUMMARY OF THE INVENTION

In order to address the above problems, the present invention provides an image processing apparatus including: an image memory that stores an image; a character recognition rate acquisition unit that segments the image stored in the image memory into multiple partial images and acquires a character recognition rate for each partial image; an image quality assessment unit that calculates a parameter showing the image quality of the image based on the character recognition rates of the multiple partial images acquired by the character recognition rate acquisition unit; and an output unit that outputs assessment results obtained by the image quality assessment unit.

BRIEF DESCRIPTION OF THE DRAWINGS

Embodiments of the present invention will be described in detail based on the following figures, wherein:

FIG. 9 explains image quality assessment;

FIG. 10 is a diagram illustrating a sample output of image quality assessment results.

DETAILED DESCRIPTION OF THE INVENTION

Figure 1:
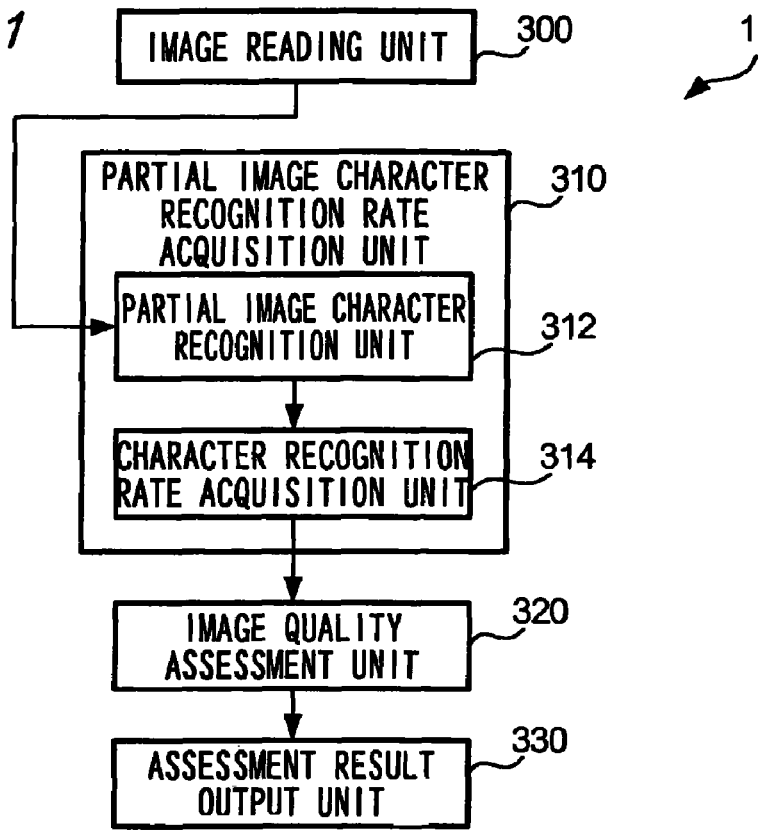
FIG. 1 is a block diagram-illustrating the functional configuration of a image reading system 1 used in an embodiment of the present invention.

Hereinafter, embodiments of the present invention are explained by referring to drawings. FIG. 1 is a block diagram illustrating the functional configuration of an image reading system 1 used in an embodiment of the present invention. An image reading unit 300 optically reads a paper manuscript and generates image data. A partial image character recognition rate acquisition unit 310 acquires the character recognition rates of partial images contained in the image data. Specifically, a partial image character recognition unit 312 segments the image data into partial images. The partial image character recognition unit 312 performs character recognition processing on the partial images. The character recognition rate acquisition unit 314 acquires a character recognition rate for each partial image. The image quality assessment unit 320 assesses the image quality of the image represented by the image data based on the character recognition rates of the partial images. An assessment result output unit 330 outputs the results of image quality assessment.

Figure 2:
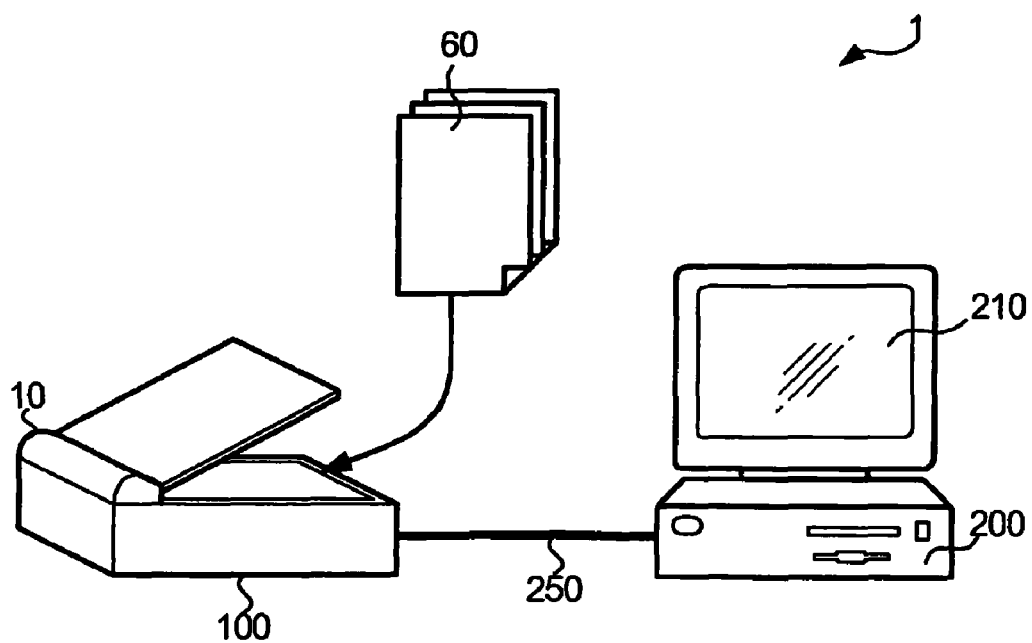
FIG. 2 is a diagram that specifically shows the configuration of the image reading system 1.

FIG. 2 is a diagram that specifically shows the configuration of the image reading system 1. The scanner 100 is an image reader furnished with an ADF (Automatic Document Feeder) 10. The scanner 100 optically reads characters, photographs, and other images recorded in a manuscript 60 being scanned, which is in paper sheet form, and generates image data corresponding to the images. A PC 200 is connected to the scanner 100 by a cable 250. The PC 200 receives image data from the scanner 100 and saves the received image data. The display, 210, which is the display device of the PC 200, is used to display scanned images, messages to the user, etc.

Figure 3:
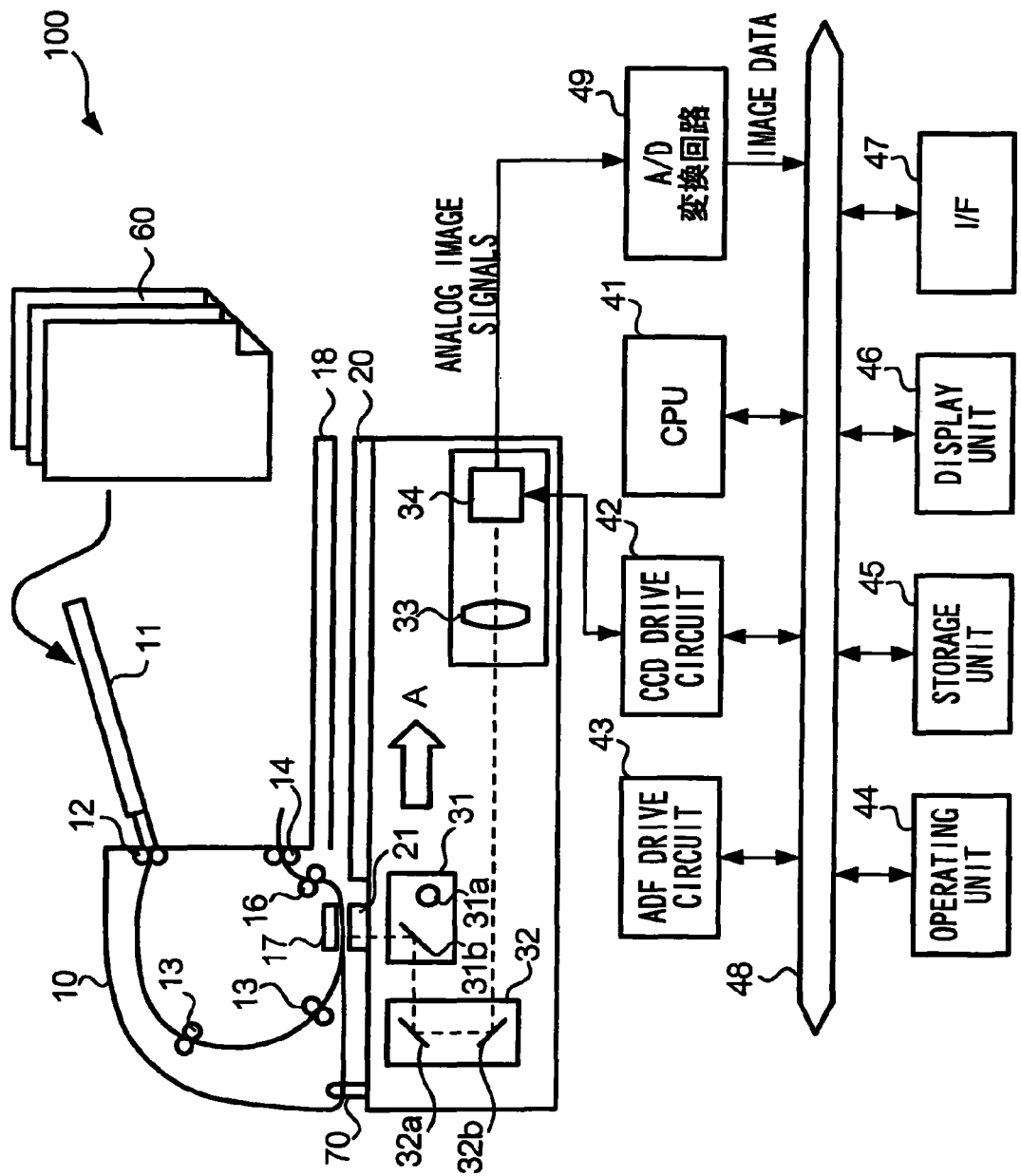
FIG. 3 is a diagram illustrating the hardware configuration of the scanner 100.

FIG. 3 is a diagram that illustrates the hardware configuration of the scanner 100. The operator can perform scanning either by using the ADF 10 so as to automatically transport a multi-page manuscript 60 to manuscript reading positions one sheet at a time or by placing the manuscript 60 on the platen glass 20 one sheet at a time by hand, without using the ADF 10.

When scanning using the ADF 10, the operator places the multi-page manuscript 60 on a tray 11. A sensor, not shown, is provided in the tray 11. The sensor detects the presence of the manuscript placed in the tray 11 and outputs a signal to this effect. The manuscript 60 is conveyed to transport rollers 13 by pull-in rollers 12 one sheet at a time. The transport rollers 13 change the direction, in which the manuscript is transported, and transport the manuscript 60 towards a platen glass 20. The thus transported manuscript 60 is pressed against a platen glass 21 by a back platen 17 and then ultimately ejected from the ADF 10 by discharging rollers 14. The manuscript reading positions are provided in four locations from the upstream to the downstream of the transportation path on the platen glass 20. In each of these reading positions, the manuscript 60 is transported at a constant speed. Moreover, in the reading positions, it is illuminated with a light source 31a, with the optical path of the light reflected by the manuscript 60 (manuscript image) modified by mirror 31b, mirror 32a, and mirror 32b. The reflected light, whose optical path is modified, is condensed by lens 33, and imaged onto a CCD (Charge Coupled Devices) sensor 34. The CCD sensor 34 is, for example, a 4-line CCD sensor. The CCD sensor 34 outputs analog picture signals R, G, B, and BW to the next-stage circuitry in response to the reflected light (manuscript image), which is inputted under the control of a CCD drive circuit 42 in each reading position.

When the process of reading the manuscript 60 is over, it is transported by the transport rollers 16 and discharged into a discharge tray 18 by discharging rollers 14.

When scanning without using the ADF 10, the operator places the manuscript 60 on the platen glass 20 one sheet at a time. When a scanning command is entered by pressing a start button on the operating unit 44 or by some other method, the manuscript image is read while the first CRG 31, including the light source 31a, moves in the direction "A" in FIG. 3. The CCD sensor 34 outputs analog picture signals R, G, B, and BW to the next-stage circuitry, in the same manner as when using the ADF 10

The analog picture signals R, G, B, and BW outputted from the CCD sensor 34 are converted into digital image data R, G, B, and BW by an A/D conversion circuit 49. A shading correction circuit, etc., not shown, corrects the digital image data R, G, B, and BW in accordance with the luminous energy distribution characteristic of the optical system and sensitivity variation of the CCD sensor 34. The thus corrected digital image data R, G, B, and BW are stored in a storage unit 45.

The ADF drive circuit 43 drives the ADF 10 based on control signals from a CPU (Central Processing Unit) 41. Moreover, the ADF drive circuit 43 has a function to count the number of sheets (number of pages) in the manuscript transported by the ADF 10 and output a signal indicating the number of sheets (number of pages) in the manuscript. The display unit 46 comprises, for instance, a liquid crystal display and displays messages or operating states to the operator based on control signals from the CPU 41. The operating unit 44, which is made up of a touch panel etc. on a liquid crystal display, a stop button, a start button, and the ten keys, outputs signals corresponding to the operator's operating input and the screens displayed at such time. The storage unit 45 stores threshold values and various tables, etc. used for various control programs and for image quality assessment processing, which will be described later. The I/F 47 is an interface used to send and receive data between the apparatus and external devices such as the PC 200. These components are interconnected by a bus 48 and can exchange data.

Figure 4:
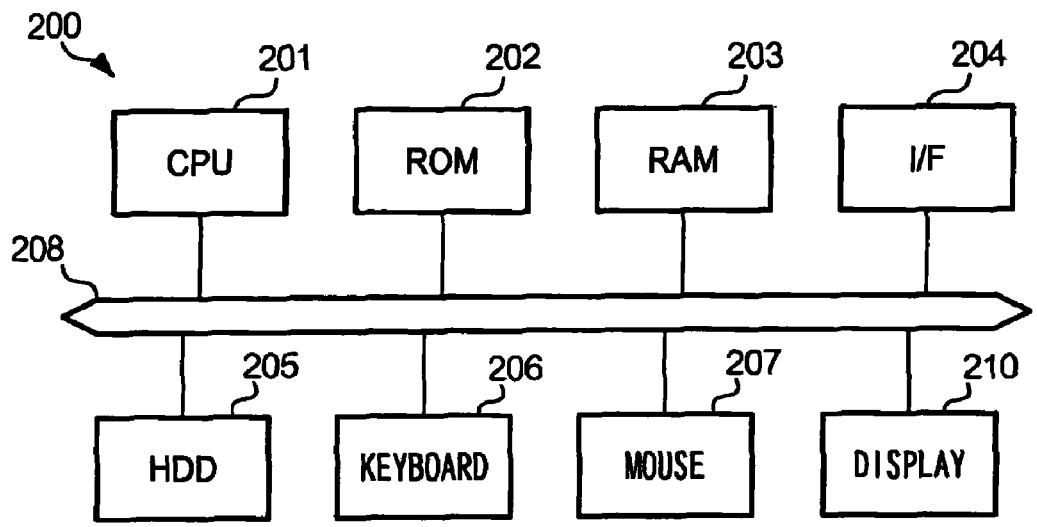
FIG. 4 is a diagram illustrating the hardware configuration of the PC 200.

FIG. 4 is a diagram illustrating the hardware configuration of the PC 200. The CPU 201 uses a RAM 203 as a work area to execute programs stored in a computer-readable storage unit (for example a ROM 202 or on a HDD 205). The user can perform input of instructions to the PC 200 by operating a keyboard 206 or a mouse 207. The PC 200 is connected to the scanner 100 via an interface 204, and can exchange data with the scanner 100. These components are interconnected by a bus 208. The programs executed by the CPU 201 may include program instructions.

Figure 5:
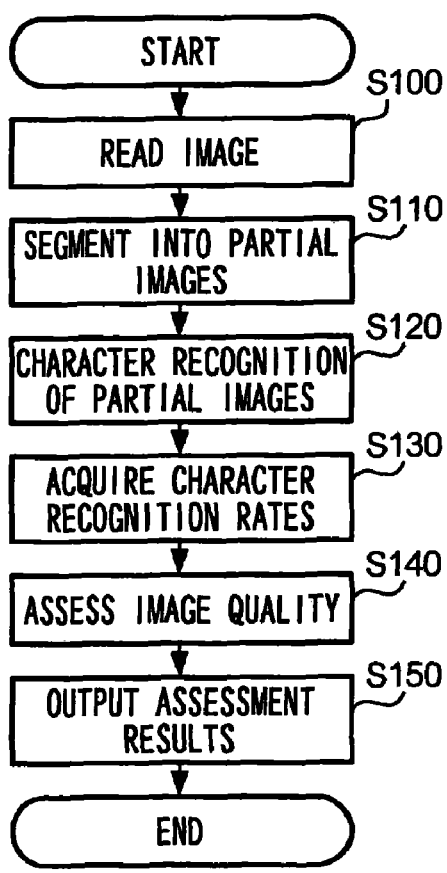
FIG. 5 is a flowchart illustrating the operation of the image reading system 1.

FIG. 5 is a flowchart that illustrates the operation of the image reading system 1. When a power supply, not shown, is turned on, theCPU 41 of the scanner 100 reads and executes control programs stored in the storage unit 45. By executing the control programs, the CPU 41 acquires the functional components shown in FIG. 1.

First of all, the scanner 100 reads an image (step S100). The processing is started, for instance, as soon as the user places a manuscript 60 in the tray 11 and presses the start button on the operating unit 44. The CPU 41 controls the ADF drive circuit 43 and the CCD drive circuit 42 to generate image data D (scanned image) from the manuscript 60. The CPU 41 stores the generated image data D in the storage unit 45.

Figure 6:
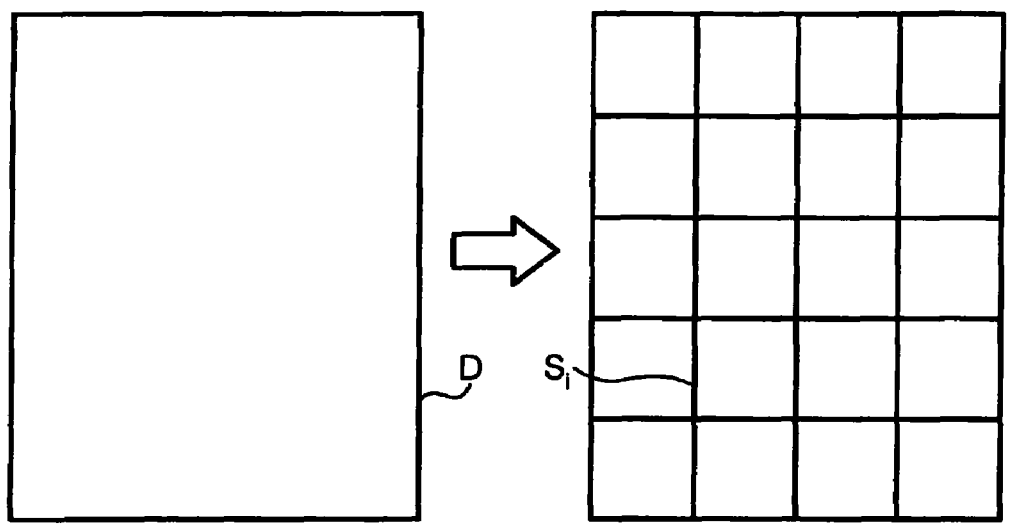
FIG. 6 is a diagram illustrating the way image segmentation is performed in the present embodiment.

Next, the CPU 41 segments the scanned image into partial images (Step S 110). FIG. 6 is a diagram illustrating the way image segmentation is performed in the present embodiment. For instance, the CPU 41 segments the scanned image D into n partial images. FIG. 6 shows an embodiment of the invention, wherein the image is segmented into 4(W)×5(L)=20 partial images (n=20). At this point, an identification number i is sequentially assigned to each partial image starting from the upper left corner, designating it as the "i-th partial image $S_i$" (where i is an integer satisfying the condition $1 \leq i \leq n$).

Figure 7:
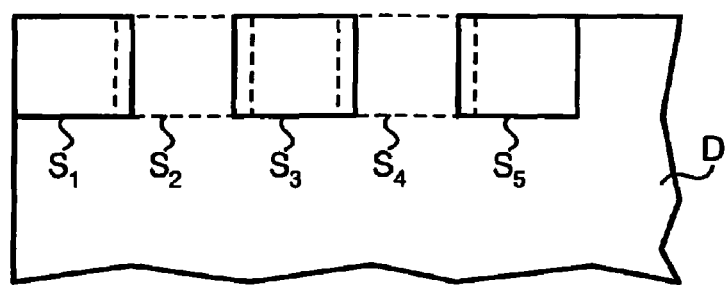
FIG. 7 explains another embodiment of image segmentation.
Figure 8:
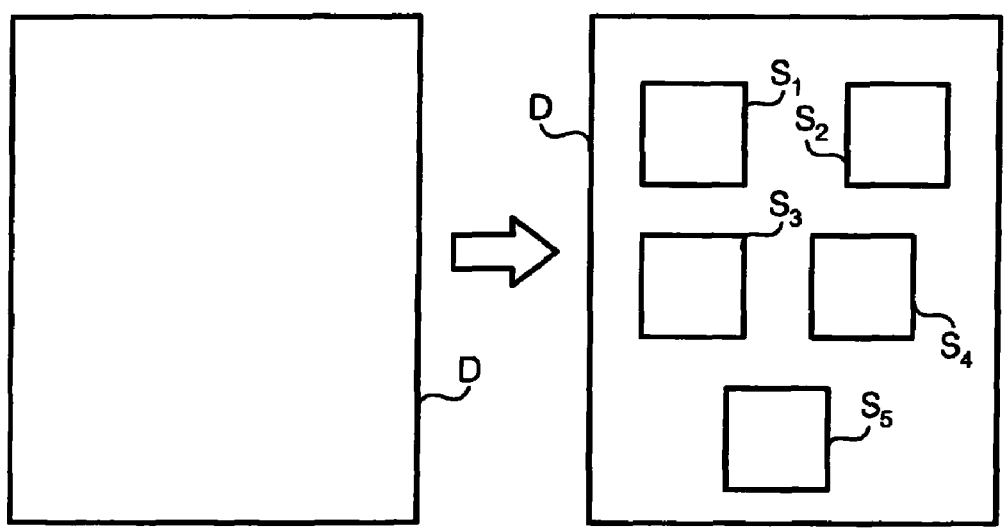
FIG. 8 explains another embodiment of image segmentation.

In addition, embodiments of scanned image segmentation are not limited to the one shown in FIG. 6. FIG. 7 and FIG. 8 explain another embodiment of image segmentation. As shown in FIG. 7, partial images S generated by image segmentation may have mutually overlapping regions. Otherwise, as shown in FIG. 8, there may be gaps between the partial images S.

To continue our discussion, let us again refer to FIG. 5. The CPU 41 performs character recognition processing on each partial image $S_i$ (step S120). As a result of character recognition processing, the CPU 41 outputs text data contained in a partial image Si, the number of characters $M_i$ contained in a partial image Si, and a recognition accuracy $K_{ij}$ for a j-th character in a partial image $S_i$ (where j is an integer satisfying the condition $1 \leq j \leq M_i$).

Next, the CPU 41 calculates a character recognition rate $\alpha_i$ for each partial image $S_i$ (step S130). Here, the method used to calculate the character recognition rate $\alpha_i$ may be implemented in a number of ways. For instance, a threshold value $K_{th}$ of recognition accuracy K may be stored in the storage unit 45 in advance and the character recognition rate may be calculated as:

$\alpha_i$=(number of characters satisfying the condition $K_{ij} > K_{th}$)/$M_i$ (1) Otherwise, the character recognition rate $\alpha_i$ may be calculated based on the formula:

$$\alpha_i = \frac{\sum_{i}^{M_i} K_{ij}}{M_i} \quad (2)$$

In addition, in expression (2), the recognition accuracy K is normalized so as to satisfy the condition $0 \leq K_{ij} \leq 1$. The CPU 41 stores the character recognition rate $\alpha_i$ calculated as described above in the storage unit 45.

Next, the CPU 41 carries out image quality assessment based on the calculated character recognition rates $\alpha_1$ (step S140). The CPU 41 performs image quality assessment processing as explained in (1) to (5) below and outputs image quality assessment data indicating the image quality of the scanned image. When the manuscript 60 is made up of multiple pages, the CPU 41 performs processing, to be explained below, on every page and outputs image quality assessment data along with data identifying the pages being processed (step S150).

(1) Embodiments Utilizing the Minimum Value of the Character Recognition Rate $\alpha_i$ (1-1) Binary Assessment In this embodiment, the minimum value $\alpha_{min}$ of the character recognition rate $\alpha_i$ is used to output the image quality of the scanned image in binary form, i.e. as two values, "NG (bad)" or "OK (good)". A threshold value $\alpha_{th}$ for the character recognition rate $\alpha_i$ is stored in the storage unit 45 in advance. The CPU 41 decides that the image quality of the scanned image is NG when the minimum value $\alpha_{min}$ satisfies the condition:

$$\alpha_{min} < \alpha_{th} \qquad (3)$$

Data indicating that the image quality of the scanned image is NG is stored by the CPU 41 in the storage unit 45 as image quality assessment data. Conversely, the CPU 41 decides that the image quality of the scanned image is OK when the minimum value $\alpha_{min}$ does not satisfy the expression (3). In such a case, data indicating that the image quality of the scanned image is OK is stored by the CPU 41 in the storage unit 45 as image quality assessment data.

(1-2) Multi-Component Assessment

In this embodiment, the value of the character recognition rate $\alpha_i$ ($0 \leq \alpha_i \leq 1$) is outputted as a parameter showing the image quality of the scanned image. Namely, a parameter Qz, where Qz=$\alpha_i$, is stored by the CPU 41 in the storage unit 45 as image quality assessment data. Qz indicates that the image quality of the scanned image is worst when Qz=0 and that the image quality of the scanned image is best when Qz=1.

(2) Embodiments Utilizing the Maximum and Minimum Values of the Character Recognition Rate $\alpha_i$ (2-1) Binary Assessment In this embodiment, the maximum value $\alpha_{max}$ and minimum value $\alpha_{min}$ of the character recognition rate $\alpha_i$ are used to output the image quality of the scanned image in binary form, i.e. as two values, "NG" or "OK". A threshold value $\Box\alpha_{th}$ used for the difference a $\Box\alpha_i = \alpha_{max} - \alpha_{min}$) between the maximum and minimum values of the character recognition rate $\alpha_i$ is stored in the storage unit 45 in advance. The CPU 41 decides that the image quality of the scanned image is NG when $\Box\alpha_i$ satisfies the condition:

$$\Box\alpha_i > \Box\alpha_{th} \qquad (4)$$

A large $\Box\alpha_i$ means that the character recognition rate $\alpha_i$ greatly varies depending on the location of the scanned image. In such a case, with low character recognition rates, this may be due to scanning errors, such as manuscript folding and bending, adhesion of foreign matter, etc. Data indicating that the image quality of the scanned image is NG is stored by the CPU 41 in the storage unit 45 as image quality assessment data. Conversely, the CPU 41 decides that the image quality of the scanned image is OK when $\Box\alpha_i$ does not satisfy the expression (4). In such a case, data indicating that the image quality of the scanned image is OK is stored by the CPU 41 in the storage unit 45 as image quality assessment data.

(2-2) Multi-Component Assessment

In this embodiment, a parameter Qs, which is calculated based on the maximum value $\alpha_{max}$ and minimum value $\alpha_{min}$ of the character recognition rate $\alpha_i$, is outputted as a parameter indicating the image quality of the scanned image. Namely, the CPU 41 calculates the parameter Qs using, for instance, formulas such as:

$$Qs = 1 - (\alpha_{max} - \alpha_{min}) \qquad (5)$$

or $$QS = \alpha_{min}/\alpha_{max} \qquad (6)$$

Here, Qs is a real number satisfying the condition $0 \leq Qs \leq 1$. Qs indicates that the image quality of the scanned image is worst when Qs=0 and that the image quality of the scanned image is best when Qs=1. The value of the parameter Qs is stored by the CPU 41 in the storage unit 45 as image quality assessment data.

(3) Embodiments Utilizing Distance from Uniform Distribution

In this embodiment, image quality assessment is performed using the distance from uniform distribution of the character recognition rate $\alpha_i$ First of all, the character recognition rate $\alpha_i$ is normalized using the following formula.

$$\beta_i = \frac{\alpha_i}{\sum_i^n \alpha_i} \qquad (7)$$

The CPU 41 uses the distance from uniform distribution $\beta_i$ as the parameter Qs. The distance from uniform distribution is obtained, for instance, from an entropy difference in the following manner.

$$Qs = \frac{-\sum_i^n \beta_i \log \beta_i}{-\sum_i^n \frac{1}{n} \log \frac{1}{n}} \qquad (8)$$

(3-1) Binary Assessment

A threshold value $Q_{th}$ used for Qs is stored in the storage unit 45 in advance. The CPU 41 decides that the image quality of the scanned image is NG when the minimum value Qs satisfies the condition:

$$Qs < Q_{th} \qquad (9)$$

Data indicating that the image quality of the scanned image is NG is stored by the CPU 41 in the storage unit 45 as image quality assessment data. Conversely, the CPU 41 decides that the image quality of the scanned image is OK when Qs does not satisfy the expression (9). In such a case, data indicating that the image quality of the scanned image is OK is stored by the CPU 41 in the storage unit 45 as image quality assessment data.

(3-2) Multi-Component Assessment

The value of the parameter Qs, which is calculated from the expression (8), is stored by the CPU 41 in the storage unit 45 as image quality assessment data.

(4) Embodiments Combining Absolute Assessment with Relative Assessment

In the explanations of the items (1) to (3) above, the parameter Qs can be used as a parameter indicating relative image quality and Qz can be used as a parameter indicating absolute image quality. Here, relative image quality reflects the fluctuation (variance) of the character recognition rates $\alpha_i$ of the multiple partial images of the scanned image. Also, absolute image quality reflects a representative value of the character recognition rate $\alpha_i$ for the entire scanned image. Generally speaking, it may be sufficient to assess image quality based on the absolute image quality alone. However, for instance, when the image quality of the manuscript 60 is poor prior to scanning (the characters are small and there is a lot of smudging, etc.), no matter how perfectly the scanning process is carried out, the character recognition rate of the scanned image will be low. The image quality of the scanned image cannot be higher than the image quality of the manuscript 60. In such a case, the parameter indicating absolute image quality is unsuitable for the purpose of assessing the quality of scanning, which is influenced by the folding and bending of the manuscript. In this a case, it is necessary to take relative image quality into consideration.

In this embodiment, image quality assessment is performed using both absolute image quality and relative image quality. A parameter indicating a position in the distribution of the character recognition rates $\alpha_i$, such as, for example, the average value, median value, or mode value of the $\alpha_i$ can be used in addition to the minimum $\alpha_{min}$ of the character recognition rates $\alpha_i$ as a Qz parameter indicating absolute image quality. Also, a parameter indicating the spread of the distribution of character recognition rates $\alpha_i$, such as, for example, the variance, standard deviation, X % confidence interval width, etc. of the $\alpha_i$, can be used in addition to the parameters explained in (2) to (3) above as a Qs parameter indicating relative image quality.

(4-1) Binary Assessment

FIG. 9 is a diagram that explains image quality assessment according to this embodiment. For instance, as shown in FIG. 9(*a*) or (*b*), data showing OK image quality regions and NG image quality regions are stored in the storage unit 45 in advance. The CPU 41 decides whether a point P(Qs, Qz) in a two-dimensional space belongs to a NG image quality region or to an OK image quality region. Based on the results of the decision, data indicating an OK image quality or a NG image quality is stored by the CPU 41 in the storage unit 45 as image quality assessment data.

(4-2) Multi-Component Assessment

The storage unit 45 stores a function F that uses QS and QZ as variables.

$$Q=F(Qs, Qz) \quad (10)$$

For instance, a function such as the expression below can be used as the function F.

$$Q=\min(Qs, Qz) \quad (11)$$

A parameter Q, which is calculated from the expression (10), is stored by the CPU 41 in the storage unit 45 as image quality assessment data.

Otherwise, a look-up table for determining the value of Q based on the values of Qs and Qz can be stored in the storage unit 45 instead of the function F. The value of the parameter Q obtained from the look-up table is stored by the CPU 41 in the storage unit 45 as image quality assessment data.

(5) Embodiments Accounting for the Error of the Character Recognition Rate $\alpha_i$ In embodiments (1) to (4) described above, when the number of characters Mi is small, the error of the character recognition rate $\alpha_i$ may be large. Therefore, during image quality assessment processing, it is desirable not to use the character recognition rate $\alpha_i$ of a partial image $S_i$ whose number of characters $M_i$ is smaller than a predetermined number. Therefore, it is desirable to perform, for instance, the following processing. A threshold value $M_{th}$ used for the number of characters $M_i$ is stored in the storage unit 45 in advance. When the number of characters $M_i$ satisfies the condition:

$$M_i < M_{th} \quad (12)$$

the CPU 41 does not use the character recognition rate of the partial image $S_i$ for image quality assessment processing.

In addition, the character recognition rate $\alpha_i$ can be treated as a probability variable. In other words, the CPU 41 uses a t-distribution, normal distribution and other distribution functions to identify statistically significant ranges for the character recognition rate $\alpha_i$. The CPU 41 may use the thus obtained upper limits or lower limits of the character recognition rate $\alpha_i$ as $\alpha_{max}$ or $\alpha_{min}$.

To continue our discussion, let us again refer to FIG. 5. When the image quality assessment processing explained in (1) to (5) above is finished, the CPU 41 outputs the results of the assessment (step S150). The CPU 41 controls the display unit 46 to display messages and images showing the assessment results. For instance, a threshold value used for image quality assessment data is stored in the storage unit 45 in advance. The CPU 41 may decide whether scanning errors are present by comparing the image quality assessment data with the threshold value.

FIG. 10 is a diagram illustrating a sample output of image quality assessment results. As shown in FIG. 10, the CPU 41 uses the display unit 46 to display information identifying pages with scanning errors, a scanned image quality index obtained from image quality assessment data (for instance, 100 times the value of the image quality assessment data), and a message inquiring as to whether re-scanning is necessary. The user decides whether re-scanning is necessary by looking at the display and enters instructions to the scanner 100 by operating the operating unit 44.

Other Embodiments

Figure 11:
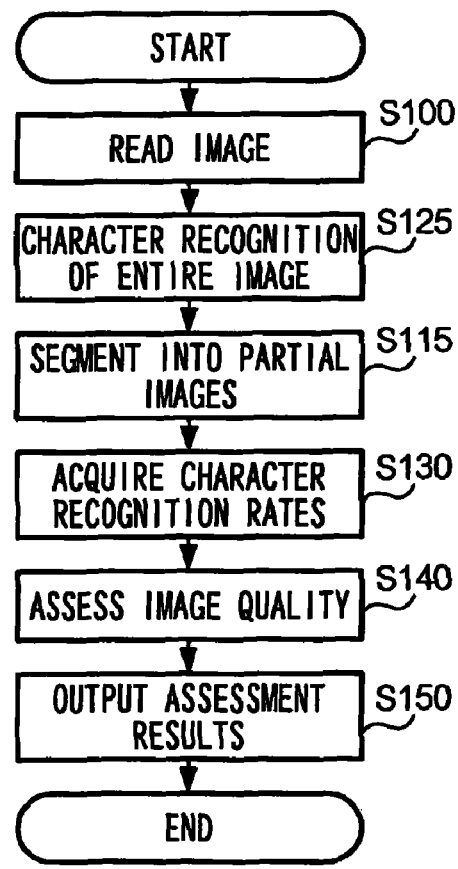
FIG. 11 is a flowchart illustrating the operation of another embodiment.

FIG. 11 is a flowchart that illustrates the operation of the image reading system 1 in another embodiment. In the embodiments explained above, the character recognition rate was calculated for each partial image after segmenting a scanned imaged into partial images. However, embodiments, in which the entire scanned image is subjected to character recognition processing (step S125) and then segmented into partial images (step S115), are also possible. In short, so long as the character recognition rate of each partial image can be acquired, the order of processing is not limited to the one shown in FIG. 5.

In addition, although the embodiments above illustrated processing carried out by the scanner 100 as shown in FIG. 5, it is also possible to use configurations, in which part or all of the processing of steps S110 to S150 is executed by the PC 200, For instance, the scanner 100 outputs the acquired image data to the PC 200. The CPU 201 of the PC 200 controls the components shown in FIG. 4 to execute the processing of steps S110 to S150. Otherwise, the processing described above can be performed using a so-called all-in-one combination device with functions for printing, faxing, and copying, which is obtained by adding an image-forming unit to the scanner 100.

The present invention provides an image processing apparatus including: an image memory that stores an image; a character recognition rate acquisition unit that segments the image stored in the image memory into multiple partial images and acquiring a character recognition rate for each partial image; an image quality assessment unit that calculates a parameter showing the image quality of the image based on the character recognition rates of the multiple partial images acquired by the character recognition rate acquisition unit; and an output unit that outputs assessment results obtained by the image quality assessment unit. With such an image processing apparatus, image quality assessment is performed based on the character recognition results obtained for the partial images. Therefore, it permits assessment of localized image quality deterioration, such as paper folding and bending.

In one embodiment, the character recognition rate acquisition unit may have an image segmentation unit that segments an image stored in the image memory into multiple partial images; and a character recognition unit that performs character recognition processing on each of the multiple partial images segmented by the image segmentation unit. Otherwise, the character recognition rate acquisition unit may have a character recognition unit that performs character recognition processing on the image stored by the image memory and an image segmentation unit that segments the image that has been subjected to character recognition processing by the character recognition unit into multiple partial images.

In another embodiment, the parameter used by the image processing apparatus may reflect a positional measure that indicates a position in the distribution of the character recognition rates of the multiple partial images. In this embodiment, the positional measure may be any of the maximum value, minimum value, mean value, median value, or mode value of the character recognition rates of the multiple partial images.

In yet another embodiment, the parameter used by the image processing apparatus may reflect a distributional measure that indicates the spread of the distribution of character recognition rates of the multiple partial images. In this embodiment, the parameter may be calculated using at least two measures among the maximum value, minimum value, mean value, median value, or mode value of the character recognition rates of the multiple partial images. Otherwise, the distributional measure may be any of the variance, standard deviation, confidence interval width, or distance from uniform distribution of the character recognition rates of the multiple partial images.

In still another embodiment, the parameter used by the image processing apparatus may be a value determined based both on the positional measure, which indicates a position in the distribution of the character recognition rates of the multiple partial images, and on the distributional measure, which indicates the spread of the distribution of the character recognition rates of the multiple partial images.

Additionally, the present invention provides an image processing method including: storing an image; acquiring character recognition rates for the image; calculating a parameter showing the image quality of the image based on the acquired character recognition rates of the plurality of partial images; and outputting assessment results based on the obtained results of the calculation. In addition, the present invention provides a storage medium storing a program that lets a computer apparatus to execute the image processing method above.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments, and with the various modifications as are suited to the particular use contemplated. It is intended that the scope of the invention be defined by the following claims and their equivalents.

The entire disclosure of Japanese Patent Application No. 2005-63996 filed on Mar. 8, 2005 including specification, claims, drawings and abstract is incorporated herein by reference in its entirety.

What is claimed is:

1. An image processing apparatus comprising:
an image memory that stores an image corresponding to each page of a document and obtained by scanning the document;
a character recognition rate acquisition unit that segments the image stored in the image memory into a plurality (n) of partial images and acquires a character recognition rate for each partial image;
an image quality assessment unit that calculates a parameter showing the image quality of the image for said each page, based on the character recognition rates of the plurality of partial images acquired by the character recognition rate acquisition unit, and decides whether a scanning error is present by comparing the parameter with a threshold value; and
an output unit that outputs a number of a page containing the scanning error, and an assessment result determined based on the parameter, and also outputs a message inquiring as to whether re-scanning is necessary if the image quality assessment unit decides that the scanning error is present, wherein
the parameter is calculated using the formula:

$$Q_s = 1 - (\alpha_{max} - \alpha_{max}) \text{ or}$$

$$Q_s = \alpha_{min}/\alpha_{max}$$

where a $\alpha_{max}$ and $\alpha_{min}$ are maximum and minimum values of character recognition rate $\alpha_i$ for each partial image, and Qs is a real number satisfying the condition $0 \leq Q_s \leq 1$,
the character recognition rate a, is normalized using the formula:

$$\beta_i = \frac{\alpha_i}{\sum\limits_{i}^{n} \alpha_i},$$

and
the parameter is alternatively calculated using the formula:

$$Q_s = \frac{-\sum\limits_{i}^{n} \beta_i \log \beta_i}{-\sum\limits_{i}^{n} \frac{1}{n} \log \frac{1}{n}}.$$

2. The image processing apparatus according to claim 1, wherein the character recognition rate acquisition unit further comprises:
an image segmentation unit that segments the image stored in the image memory into the plurality of partial images; and
a character recognition unit that performs character recognition processing on each of the plurality of partial images segmented by the image segmentation unit.

3. The image processing apparatus according to claim 1, wherein the character recognition rate acquisition unit further comprises:

a character recognition unit that performs character recognition processing on the image stored by the image memory; and an image segmentation unit that segments the image that has been subjected to character recognition processing by the character recognition unit into a plurality of partial images.

4. The image processing apparatus according to claim 1, wherein the parameter reflects a positional measure that indicates a position in the distribution of the character recognition rates of the plurality of partial images.

5. The image processing apparatus according to claim 4, wherein the positional measure is any of the maximum value, minimum value, mean value, median value, or mode value of the character recognition rates of the plurality of partial images.

6. The image processing apparatus according to claim 1, wherein the parameter reflects a distributional measure showing the spread of the distribution of the character recognition rates of the plurality of partial images.

7. The image processing apparatus according to claim 6, wherein the parameter is calculated using at least two measures from among the maximum value, minimum value, mean value, median value, or mode value of the character recognition rates of the plurality of partial images.

8. The image processing apparatus according to claim 7, wherein the distributional measure is any of the variance, standard deviation, confidence interval width, or distance from uniform distribution of the character recognition rates of the plurality of partial images.

9. The image processing apparatus according to claim 1, wherein the parameter is a value determined based both on the positional measure, which indicates a position in the distribution of the character recognition rates of the plurality of partial images, and on the distributional measure, which indicates the spread of the distribution of the character recognition rates of the plurality of partial images.

10. The image processing apparatus of claim 1, wherein the output unit notifies a user of an option to replace the stored image with a replacement image.

11. The image processing apparatus of claim 1, wherein the assessment results are at least one numerical value corresponding to the image quality of the image.

12. The image processing apparatus of claim 1, wherein the assessment results indicate a binary condition of whether or not the image quality meets a predetermined condition.

13. The image processing apparatus according to claim 1, wherein if a number characters contained in the partial image is smaller than a predetermined number, the image quality assessment unit calculates the parameter based on character recognition rates other than a character recognition rate of the partial image.

14. An image processing method comprising:
scanning a document;
storing an image corresponding to each page of the document based at least in part on the scanning of the document;
segmenting the image into a plurality (n) of partial images;
acquiring character recognition rates for the image;
calculating a parameter showing the image quality of the image for said each page, based on the acquired character recognition rates of the plurality of partial images;
deciding whether a scanning error is present by comparing the parameter with a threshold value; and
outputting a number of a page containing the scanning error, and an assessment result determined based on the parameter, and also outputting a message inquiring as to whether re-scanning is necessary if a decision that the scanning error is present has been made, wherein the parameter is calculated using the formula:

$$Qs = 1 - (\alpha_{max} - \alpha_{max}) \text{ or}$$

$$Qs = \alpha_{min} / \alpha_{max}$$

where $\alpha_{max}$ and $\alpha_{min}$ are maximum and minimum values of character recognition rate $\alpha_i$ for each partial image, and Qs is a real number satisfying the condition $0 \leq Qs \leq 1$, the character recognition rate a, is normalized using the formula:

$$\beta_i = \frac{\alpha_i}{\sum_i^n \alpha_i},$$

and
the parameter is alternatively calculated using the formula:

$$Q_s = \frac{-\sum_i^n \beta_i \log \beta_i}{-\sum_i^n \frac{1}{n} \log \frac{1}{n}}.$$

15. The image processing method of claim 14, further comprising:
outputting to a user an option to replace the stored image with a replacement image.

16. The image processing method of claim 14, wherein the assessment results are at least one numerical value corresponding to the image quality of the image.

17. The image processing method of claim 14, wherein the assessment results indicate a binary condition of whether or not the image quality meets a predetermined condition.

18. The image processing method of claim 14, further comprising:
outputting to a user an option to replace the stored image with a replacement image.

19. The image processing method of claim 14, wherein the assessment results are at least one numerical value corresponding to the image quality of the image.

20. The image processing method of claim 14, wherein the assessment results indicate a binary condition of whether or not the image quality meets a predetermined condition.

21. The image processing method according to claim 14, wherein if a number of characters contained in the partial image is smaller than a predetermined number, the parameter is calculated based on character recognition rates other than a character recognition rate of the partial image.

22. A non-transitory computer readable storage medium storing a computer readable program executable by a computer for causing the computer to execute a process, the process comprising:
scanning a document;
storing an image corresponding to each page of the document based at least in part on the scanning of the document;
segmenting the image into a plurality (n) of partial images;
acquiring character recognition rates for the image;
calculating a parameter showing the image quality of the image for said each page, based on the acquired character recognition rates of the plurality of partial images;

deciding whether a scanning error is present by comparing the parameter with a threshold value; and outputting a number of a page containing the scanning error, and an assessment result determined based on the parameter, and also outputting a message inquiring as to whether re-scanning is necessary if a decision that the scanning error is present has been made; wherein the parameter is calculated using the formula:

$$Qs = 1 - (\alpha_{max} - \alpha_{max}) \text{ or}$$

$$Qs = \alpha_{min}/\alpha_{max}$$

where $\alpha_{max}$ and $\alpha_{min}$ are maximum and minimum values of character recognition rate $\alpha_i$ for each partial image, and $Qs$ is a real number satisfying the condition $0 \leq Qs \leq 1$, the character recognition rate $\alpha_i$, is normalized using the formula:

$$\beta_i = \frac{\alpha_i}{\sum_i^n \alpha_i},$$

and the parameter is alternatively calculated using the formula:

$$Q_s = \frac{-\sum_i^n \beta_i \log \beta_i}{-\sum_i^n \frac{1}{n} \log \frac{1}{n}}.$$

23. The non-transitory computer readable storage medium according to claim 22, wherein if a number of characters contained in the partial image is smaller than a predetermined number, the parameter is calculated based on the character recognition rates other than a character recognition rate of the partial image.

* * * * *